United States Patent [19]

Corbellini et al.

[11] 4,217,245

[45] Aug. 12, 1980

[54] CHEMICAL COMPOSITIONS BASED ON TITANIUM TRIHALIDES, METHOD FOR THEIR PREPARATION AND THEIR USES

[75] Inventors: Margherita Corbellini, Milan; Alessandro Gamba, Dalmine; Carlo Busetto, Padova, all of Italy

[73] Assignee: Snamprogetti, S.p.A., San Donato Milanese, Italy

[21] Appl. No.: 911,920

[22] Filed: Jun. 2, 1978

[30] Foreign Application Priority Data

Jun. 30, 1977 [IT] Italy ............................... 25233 A/77

[51] Int. Cl.² .............................................. C08F 4/64
[52] U.S. Cl. ............................ 252/429 B; 252/429 C; 252/441; 252/442; 526/137; 526/144; 526/158; 526/159; 526/114; 526/115; 526/116; 526/125
[58] Field of Search ............... 252/429 B, 429 C, 441, 252/442

[56] References Cited

U.S. PATENT DOCUMENTS

| | | | |
|---|---|---|---|
| 3,094,568 | 6/1963 | Hay et al. ..................... | 252/429 B X |
| 3,166,542 | 1/1965 | Orzechowski et al. ..... | 252/429 C X |
| 3,316,314 | 4/1967 | van den Berg ............... | 252/429 C X |
| 3,365,434 | 1/1968 | Coover et al. ................ | 252/429 B X |
| 3,432,513 | 3/1969 | Miller et al. .................. | 252/429 B X |
| 3,759,884 | 9/1973 | Tokuzumi et al. ........... | 252/429 C X |
| 3,769,373 | 10/1973 | Reed et al. ..................... | 252/429 C X |
| 3,923,687 | 12/1975 | Shirai et al. ...................... | 252/429 C |

OTHER PUBLICATIONS

Timms, "Synthetic Reactions of Metal Atoms at Temperatures of 10° to 273° K.,", Angewandte Chemie, vol. 14, No. 5, pp. 273–277, May, 1975.

*Primary Examiner*—Patrick Garvin
*Attorney, Agent, or Firm*—Morgan, Finnegan, Pine, Foley & Lee

[57] ABSTRACT

A novel catalyst system for the polymerization or copolymerization of olefines, more particularly to ethylene is disclosed. For preparing the novel catalyst system, a titanium compound (Ti IV) is previously attached to a solid supporting member, whereafter the so anchored Ti is reacted with vapors of a metal, in the presence of a halogenated compound or not. Very high polymer yields are obtained and examples are given.

10 Claims, No Drawings

CHEMICAL COMPOSITIONS BASED ON TITANIUM TRIHALIDES, METHOD FOR THEIR PREPARATION AND THEIR USES

This invention relates to novel chemical compositions based on a titanium trihalide, to the method of their preparation and to their uses.

Such novel compositions have been obtained by two sequential reactions, the first of which provides for the treatment, with conventional procedures, of a compound of tetravalent titanium with a solid supporting member, and the second provides for the reaction, under the conditions and with the procedures to be specified hereinafter, of the composition obtained in the first step with the vapors of one or more metals selected from the group consisting of Mg, Al, Ti, Mo, Zr, V, Mn, Cr, Fe, Zn, in the presence (or not) of a compound capable of furnishing halogen atoms.

A number of methods have been disclosed for supporting titanium compounds, or, as in the case of the U.S. patent application, Ser. No. 926,518, filed July 20, 1978, which is a continuation of U.S. patent application, Ser. No. 763,077, filed Jan. 27, 1977, now abandoned, in combination with compounds of other metals.

According to this prior teaching, the product of the reaction between titanium tetrachloride, vapors of magnesium, and a halogen donor is subsequently contacted with a solid supporting member after that the latter has previously been reacted with a compound of the formula $AlR_3$.

It has now surprisingly been found, and this is one of the features of the present invention, that it is possible to obtain compositions formed by a halide of trivalent titanium and halides of one or more metals, all bound to a solid supporting member, by causing the reaction to take place, under the conditions and with the procedures to be specified hereinafter, between tetravalent titanium which has previously been anchored to the supporting member, and the vapors of such metals, in the presence of a halogen-donating organic or inorganic compound.

The compositions in question contain the halides in a ratio of any one of them to any other of them which can be varied within a wide range. More particularly, if no halogen-donor is used, the compositions in question have a molar ratio which reproduces the stoichiometric relationships corresponding to the formula $nTiX_3 \cdot MX_n$ wherein n is the valency of the metal, M, concerned and X is a halogen. If, conversely, a halogen-donor is used with an excess of vapors of one or more metals, compositions are obtained, which are no longer stoichiometric, but have any desired M/Ti ratio greater than 1:n, which may even reach 50 or 100 and higher values.

The present invention relates also to the method by which such formulations are obtained.

The procedures for their preparation are extremely simple, and comprise the following sequential steps:

(a) treating the solid supporting member with a compound of titanium (IV) under such conditions as to make the absorption possible.

(b) reacting the product thus obtained with the vapors of one or more metals such as Mg, Al, Ti, Zr, Mo, V, Mn, Cr, Fe, Zn, in the presence, or not, of an inorganic or organic halogen-donor compound.

The reaction is preferably carried out in the presence of an organic diluent in which the titanium compound and the halogen-donor, if any, are slurried before contacting them with the metal vapors.

The vaporization of the metal is carried out under pressures comprised between 1 and $10^{-6}$ Torr, and at a temperature which is variable and is generally comprised between 300° C. and 2500° C., consistently with the metal concerned.

The reaction of the vapors so produced with the titanium compound, irrespective of the presence or absence of the halogen-donor, takes place at comparatively low temperatures, which are below the boiling point temperature of the diluent under the pressure conditions which are adopted, and lie preferably within the range $-80°$ C. $-+50°$ C.

As outlined above, it is preferred that such a reaction be carried into effect in the presence of an organic diluent, which is selected from among the aliphatic or aromatic hydrocarbons or their mixtures.

The solid supporting member used is a material selected from among the following classes of compounds:

(a) compounds of an inorganic nature, selected from among the halides, the oxyhalides, the oxides, the hydroxides and their mixtures, of elements of the IIA, IIIB, IVB Groups of the periodic system and of the rare earth elements.

(b) compounds of an organic nature having a high molecular complexity and containing functional groups.

The above mentioned reference to the Groups of the periodic sytem is based on "Advanced Inorganic Chemistry", by Cotton and Wilkinson, Interscience Publishers, 1965. As the halogen donors, there can be used organic halides, and preferably those having the formula $C_mH_{2m+2-x}X_x$, wherein X is chlorine or bromine, m is a number comprised between 1 and 18, and x is a number variable between 1 and 4, and such halides can also act as the diluent medium aforementioned, as an alternative, inorganic high-valency inorganic halides can be used, of elements capable of existing in at least two oxidation states, such as $SnCl_4$, $SbCl_5$, $POCl_3$, $VCl_4$. As regards the compound of tetravalent titanium, the latter can be selected among a wide variety which comprises titanium tetrachloride, the halogen-Ti-alcoholates, Ti dicylopentadienyl dichloride, Ti tetrabenzyl, Ti tetrabenzyl chloride, Ti tetraallyl, Ti amides and chloroamides and many others.

When carrying the method outlined above into practice, it has been seen that the by-products of the reaction carried out with an inorganic halide can be left occluded in the compositions in question inasmuch as they do not originate any noteworthy alterations in the practical use.

The prominent use of the compositions thus obtained by the invention is that of catalyst components in the polymerization and copolymerization of alpha-olefines and, more particularly, in the polymerization of ethylene to linear polyethylene.

The use of such systems which are supported by a solid supporting member, be these supporting members of an inorganic nature, such as alumina, silica and magnesia, or of an organic nature and polymeric structure, such as polydiolefines, butadienestyrene copolymer, polyvinylpiridine, permits to obtain yields which are definitely higher than those obtainable with the prior art catalyst systems, for example higher than 150,000 grams of polyethylene per gram of Ti employed.

An additional advantage achieved by using the present catalyst systems is that even in the polymerization of ethylene with no diluent being present (such as in gaseous phase) high yields are obtained. This is a confirmation of the fact that the compositions as obtained according to the present invention have a behaviour which has never been experienced heretofore.

The polymerization reaction provides for the use of a catalyst system composed by a formulation obtained as outlined above, along with an organic metallic compound of aluminum having the formula $$AlR_pX_{3-p} (1 \leq p \leq 3)$$

wherein X is chlorine or bromine, R is a hydrocarbonaceous radical such as an alkyl, an aryl, a cycloalkyl, an alkaryl or an aralkyl.

The working conditions adopted for the polymerization are as follows: temperature between 20° C. and 200° C., pressures between 1 and 60 atm.

A few illustrative nonlimiting examples of the invention are reported hereinafter.

EXAMPLE 1

3 Grams of SiO$_2$, grade 56 of Davison Chemical, having a surface area of 285 sq. meters per gram, a diameter of the pores of 168 Angstrom units and a volume of the pores of 1.20 cu. cm per gram are dried during 7 hours at 250° C., whereafter they are refluxed, under a nitrogen blanket, in 150 mls of TiCl$_4$ for 4 hours. Filtration under hot conditions and nitrogen blanket is effected on a diaphragm of sintered glass, the product is washed on the filter anhydrous nor.hexane, whereafter vacuum drying is carried out. A product is obtained, which contains 4.61% of titanium corresponding to a total of 2.9 mM, which is charged in the rotary flask of an apparatus for the vaporization of metals under vacuum. At the center of the flask a spiralled tungsten filament (basket) is arranged, which is connected to a source of electricity. Under the flask a cold bath is horizontally arranged. In the fixed top portion of the apparatus there are a nitrogen inlet and a vacuum intake. The basket is charged with 2.7 grams of magnesium, equivalent to 112 mM and the flask is charged, in addition to the titanium compound mentioned above, with 320 mls of octane and 33 mls of nor.chlorohexane equivalent to 240 mM. The flask is cooled to −50° C. and is driven to rotation, vacuum is applied at 10$^{-2}$ mmHg and the spiral is heated so as to vaporize the metal. A brown-black slurry is formed. On completion of the vaporization, which takes about 20 mins., nitrogen is fed into the apparatus, the flask is brought to room temperature again and is subsequently heated for 2 hrs. to 95° C. The chemical analysis indicates that the product thus obtained, in addition to the presence of the silica, has the empyrical formula:

$$TiMg_{38}Cl_{76}.$$

ETHYLENE POLYMERIZATION TEST

A two-liter autoclave equipped with an anchor-shaped stirrer is charged with 1 liter of nor.heptane (deaerated and dehydrated), 2 mM of Al (isobutyl)$_3$ and a quantity of the composition prepared as described above, equivalent to 0.005 mM of titanium.

The temperature is raised to 85° C., whereafter there are charged 2 kg/sq. cm of hydrogen and 2.5 kg/sq. cm of ethylene so as to keep the overall pressure constant for 2 hours. There are obtained 194 grams of polyethylene having the following properties: MFI$_{2,16}$ (ASTM D 1236-65T)=0.45 grams/10 mins, MFI$_{21,6}$/MFI$_{2,16}$=32 and a density of 0.971 grams/cu. cm. The specific activity is 162,000 grams of polymer per gram of Ti, per hour and per atm of ethylene.

A supporting member, which contains 4.61% of titanium, but which has not been treated with magnesium vapors and nor.chloroexane, is used for an ethylene polymerization test under the same conditions as reported hereinabove. It has a specific activity of only 200 grams of polymer per gram of Ti, per hour and per atm of ethylene. The MFI$_{2,16}$ of the polymer is 0.02 grams/10 mins.

EXAMPLE 2

The procedure is the same as in Example 1 but the supporting member is AKZO alumina, grade B, having a surface area of 360 sq. meters per gram and a volume of the pores of 1.5 ml per gram, which has been dried for 8 hrs at 350° C. A product is obtained which contains 2.39% of titanium and which is treated with vaporized magnesium in the presence of nor.chlorohexane as described in Example 1. A product is obtained which has the empyrical formula TiMg$_{41}$Cl$_{81}$, in addition to the alumina. The product which has thus been prepared is used in the polymerization of ethylene, under the same conditions as described in Example 1: a specific activity is obtained which is 30,000 grams of polymer per gram of Ti, per hour and per atm of ethylene. The polyethylene as obtained in this manner has an MFI$_{2,16}$ of 0.65 grams/10 mins and a density of 0.970 grams/cu. cm. A supporting member which contains the 2.39% of titanium but which did not undergo the treatment with magnesium vapors and nor.chlorohexane has, in the polymerization of ethylene, a specific activity as low as 260 grams of polymer per gram of Ti, per hour and per atm of ethylene. The as obtained polymer does not flow in the molten state under a load of 2.16 kgs.

EXAMPLE 3

A one-liter autoclave equipped with an anchor-shaped stirrer and which has carefully been deaerated and dehydrated under hot conditions, is charged, under a nitrogen blanket, with an amount of catalyst, prepared according to Example 1, which is equivalent to 0.0075 milligram atoms of titanium and which is impregnated with 2 mM of Al (isobutyl)$_3$. The autoclave is evacuated to remove the nitrogen, whereafer ethylene is introduced to a gauge pressure of 1.5 kilograms/sq. cm, while the temperature is raised to 80° C. During progress of the polymerization, ethylene is introduced so as to keep the gauge pressure constant. The absorption of ethylene is checked by a rotameter. The polymerization is stopped after 5 hrs: during this period of time the absorption remains constant. There have been obtained 62 grams of polymer, corresponding to a specific activity of 14,000 grams of polymer per gram of Ti, per hour and per atm of ethylene.

EXAMPLE 4

The procedure of Example 1 is repeated by using the same supporting member in the amount of 2 grams. The product which contained 4.5% of titanium, equivalent to 1.86 mM in total, was charged in the rotary flask described in Example 1, wherein the spiralled tungsten filament has been replaced by a molybdenum boat in which 0.052 gram of manganese has been placed, that which is tantamount to 0.94 mM, and the flask is charged with 150 mls of anhydrous and deaerated octane. The flask is cooled to −50° C. and evacuated with a diffusion pump to $10^{-3}$ mmHg, the boat being heated so as to vaporize the manganese. On completion of the vaporization, which takes about 30 mins, nitrogen is introduced in the apparatus and the flask is brought to room temperature again.

The product has the composition $TiMn_{0.5}Cl_4$, in addition to the silica. The same product, as used in the polymerization of ethylene, under the same conditions as in Example 1, and with a concentration of Ti equivalent to 0.02 mM gives a specific yield of only 3,100 grams of polymer per gram of Ti, per hour and per atm of ethylene. The as-obtained polymer has an $MFI_{2.16}$ of 0.91 grams per 10 mins and a density of 0.972 grams per cu. cm.

EXAMPLE 5

The procedure is the same as in Example 1 and the same supporting member is used (1 gram). The product which contains 4.5% of titanium, equivalent to 0.93 mM in total of titanium, is charged in the rotary flash described in Example 1, wherein the coiled tungsten filament has been replaced by a molybdenum boat in which there are charged 0.6 grams of manganese, equivalent to 10.8 mM. The flask is charged with 150 mls of octane and 3.3 mls of nor. chlorohexane, equivalent to 24 mM. The flask is cooled to $-50°$ C., whereafter it is evacuated with a diffusion pump to $10^{-3}$ mmHg and the boat is heated so as to vaporize the manganese, a brown suspension being thus obtained. On completion of the vaporization stage, which takes about 30 mins., nitrogen is introduced in the flask and the latter is restored to room temperature, whereafter it is heated for 2 hrs. to 90° C. On the basis of the chemical analysis, the product contains $TiMn_{11}Cl_{23}$. The suspension used in the polymerization of ethylene, under the same conditions as in Example 1, gives a specific activity of 27,000 grams of polymer per gram of Ti, per hour and per atm of ethylene. The polymer which has been obtained has an $MFI_{2.16} = 0.35$ grams/10 mins. and a density of 0.970 grams/cu.cm.

We claim:

1. A composition based on titanium trihalide and a halide of one or more metals selected from the group consisting of Mg, Al, Ti, Zr, Mo, V, Mn, Cr, Fe and Zn, characterized in that it is prepared by reacting a tetravalent titanium compound, which tetravalent titanium compound has previously been anchored to a solid supporting member, with the vapor of one or more of said metals, in the presence, or not, of a halogenated compound selected from the group consisting of an organic halogen of the formula $C_m H_{2m+2-x} X_x$ wherein X is a chlorine or bromine, m is a number from 1–18, x is a number from 1–4, and a high valency halide of an element capable of existing in at least two states of valency.

2. A composition according to claim 1 characterized in that said preparation reaction takes place in the presence of said halogenated compound.

3. A composition as claimed in claim 1 wherein said high valency halide is selected from among $SnCl_4$, $SbCl_5$, $POCl_3$ and $VCl_4$.

4. A composition according to claim 1 wherein the solid supporting member is selected from among the following classes of compounds:
  (a) compounds of an inorganic nature, selected from among the halides, the oxides, the oxyhalides, the hydroxides and their mixtures, of elements belonging to the Groups IIA, IIIB, IVB of the Periodic System and of the rare earth elements, and
  (b) compounds of an organic nature having a high molecular complexity and containing functional groups.

5. A composition according to claim 4, wherein the compounds of the group (a) are selected from among alumina, silica and magnesia.

6. A composition according to claim 4, wherein the compounds of group (b) are selected from among polydiolefines, copolymer butadiene-styrene and polyvinylpiridines.

7. A composition according to claim 1, wherein the compound of titanium is selected from among the tetrahalides, the amidohalides, the alcoholate halides, the allyl and benzyl derivatives.

8. A composition according to claim 1 characterized in that the reaction of preparation is carried out in the presence of an inert diluent.

9. A composition according to claim 8, wherein the inert diluent is selected from among the aliphatic and aromatic hydrocarbons and their mixtures.

10. A composition according to claim 1, characterized in that the reaction between the metallic vapors and the titanium compound is carried out at a temperature between $-80°$ C. and $+50°$ C.

* * * * *